US009243752B2

(12) United States Patent
Kang et al.

(10) Patent No.: US 9,243,752 B2
(45) Date of Patent: Jan. 26, 2016

(54) CONTAINER FOR STORING, TRANSPORTING, AND DISASSOCIATING HYDRATE PELLETS AND METHOD FOR STORING, TRANSPORTING, AND DISASSOCIATING HYDRATE PELLETS BY USING SAME

(75) Inventors: Hee Jin Kang, Daejeon (KR); Dong Kon Lee, Daejeon (KR); Jin Choi, Chungcheongnam-do (KR)

(73) Assignee: KOREA INSTITUTE OF OCEAN SCIENCE AND TECHNOLOGY, Gyeonggi-do (KR)

( * ) Notice: Subject to any disclaimer, the term of this patent is extended or adjusted under 35 U.S.C. 154(b) by 0 days.

(21) Appl. No.: 14/365,628

(22) PCT Filed: Sep. 6, 2012

(86) PCT No.: PCT/KR2012/007145

§ 371 (c)(1), (2), (4) Date: Jun. 14, 2014

(87) PCT Pub. No.: WO2014/038734

PCT Pub. Date: Mar. 13, 2014

(65) Prior Publication Data

US 2014/0326429 A1 Nov. 6, 2014

(30) Foreign Application Priority Data

Sep. 4, 2012 (KR) ........................ 10-2012-0097461

(51) Int. Cl.

*C01B 6/00* (2006.01)
*B01J 8/08* (2006.01)

(Continued)

(52) U.S. Cl.

CPC ... *F17C 5/00* (2013.01); *C10L 3/06* (2013.01); *F17C 1/12* (2013.01); *F17C 3/00* (2013.01);

(Continued)

(58) Field of Classification Search

CPC .............. F17C 1/12; F17C 13/00; F17C 5/00; F17C 2221/03; F17C 2265/03–2265/032; F17C 2270/0105; F17C 2270/011; F16K 3/08; F16K 3/085; F16K 27/041; C10L 3/06; C10L 3/107; C10L 3/108

See application file for complete search history.

(56) References Cited

U.S. PATENT DOCUMENTS 3,486,831 A * 12/1969 Miele ............................ 415/119
5,540,190 A * 7/1996 Rogers et al. ................. 123/1 A (Continued)

FOREIGN PATENT DOCUMENTS

JP 2003-172496 * 6/2003
JP 2003-15172496 6/2003

(Continued)

*Primary Examiner* — Frantz Jules
*Assistant Examiner* — Keith Raymond
(74) *Attorney, Agent, or Firm* — Adam Warwick Bell; Matthew Rupert Kaser

(57) ABSTRACT

Disclosed is a container for storing, transporting, and dissociating hydrate pellets, the container comprising: a first container (100) made up of a plurality of frames; a second container (200) which is rotatably installed inside the first container (100), stores hydrate pellets therein, and has an internal surface to which a heat insulating member is attached; and a refrigerating machine (300) which is installed inside the first container (100) and refrigerates the second container (200), wherein the second container (200) is equipped with a heating wire (210), which is heated to dissociate the hydrate pellets by being supplied with power, or with a hot water tube (220), through which hot water flows to dissociate the hydrate pellets, on the internal surface thereof.

5 Claims, 10 Drawing Sheets

(51) Int. Cl.

| | |
|---|---|
| ***C07C 9/00*** | (2006.01) |
| ***F17C 5/00*** | (2006.01) |
| ***C10L 3/06*** | (2006.01) |
| ***F17C 1/12*** | (2006.01) |
| ***F17C 3/00*** | (2006.01) |
| *C10L 3/10* | (2006.01) |

(52) U.S. Cl.

CPC ................ *C10L 3/107* (2013.01); *C10L 3/108* (2013.01); *F17C 2201/0109* (2013.01); *F17C 2201/035* (2013.01); *F17C 2201/052* (2013.01); *F17C 2201/054* (2013.01); *F17C 2203/03* (2013.01); *F17C 2205/0107* (2013.01); *F17C 2205/0126* (2013.01); *F17C 2205/0192* (2013.01); *F17C 2205/0323* (2013.01); *F17C 2205/0394* (2013.01); *F17C 2221/03* (2013.01); *F17C 2221/036* (2013.01); *F17C 2223/0176* (2013.01); *F17C 2225/0123* (2013.01); *F17C 2227/0304* (2013.01); *F17C 2227/0316* (2013.01); *F17C 2227/0337* (2013.01); *F17C 2227/0379* (2013.01); *F17C 2227/0381* (2013.01); *F17C 2250/043* (2013.01); *F17C 2250/0439* (2013.01); *F17C 2265/03* (2013.01); *F17C 2265/031* (2013.01); *F17C 2265/05* (2013.01)

(56) References Cited

U.S. PATENT DOCUMENTS

| | | | | |
|---|---|---|---|---|
| 6,389,820 | B1 * | 5/2002 | Rogers et al. | 62/45.1 |
| 2003/0031970 | A1 * | 2/2003 | Shimada et al. | 431/204 |
| 2007/0100178 | A1 * | 5/2007 | Carstens et al. | 585/15 |

FOREIGN PATENT DOCUMENTS

| | | | | |
|---|---|---|---|---|
| JP | 17255075 | | | 9/2005 |
| JP | 21241906 | | | 10/2009 |
| KR | 100941485 | B1 | * | 2/2010 |
| KR | 100941485 | B1 | | 2/2010 |
| KR | 1020110019957 | A | | 2/2011 |
| KR | 1020110021307 | A | * | 2/2011 |
| KR | 1020110021307 | A | | 4/2011 |

* cited by examiner

CONTAINER FOR STORING, TRANSPORTING, AND DISASSOCIATING HYDRATE PELLETS AND METHOD FOR STORING, TRANSPORTING, AND DISASSOCIATING HYDRATE PELLETS BY USING SAME

TECHNICAL FIELD

The present invention relates to a container for storing, transporting, and dissociating hydrate pellets, and a method for storing, transporting, and dissociating hydrate pellets using the same container.

BACKGROUND ART

A hydrate is a solid substance, water ice, composed of water molecules and gas molecules. Hydrates are formed by brining gas molecules into contact with water at a predetermined pressure and temperature, and the hydrates can be dissociated back into water and gas molecules by changing the pressure or temperature.

Hydrates have attracted attention as an alternative means for transporting and storing natural gas, which can substitute for LNG, due to its high gas-retaining property.

FIG. 1 is a diagram illustrating the construction of a conventional gasifying apparatus for gasifying hydrates of natural gas back into gas.

For example, Korean Patent Application No. 10-2009-0077592 discloses a gasifying apparatus for gasifying hydrates of natural gas. According to Korean Patent Application No. 10-2009-0077592, as illustrated in FIG. 1, the gasifying apparatus includes at least one inlet 102, through which hydrates are continuously introduced, a guide member 104, which guides hydrates so that the hydrates are brought into contact with a heating means to be gasified, a gas outlet 106, which is disposed at an upper end of the apparatus and through which gasified natural gas is discharged outside, and a drain which is installed at the bottom and through generated water is drained.

Generally, Natural Gas Hydrates (NGHs) are stored and transported in the form of NGH pellets in a large volume tank. In this case, there is a problem that hydrate pellets adhere to each other due to their own weights.

For gasification or dissociation (hereinafter, collectively referred to as dissociation) of hydrate pellets, there are two conventional dissociation methods: a method of fracturing the adhered hydrate pellets on a ship, transporting the fractured hydrate pellets to land, and dissociating the fractured hydrate pellets on land; and a method of directly dissociating hydrate pellets by heating the tank by means of hot water or heating wire on a ship.

Both of these methods have a problem that the ship, on which a hydrate storage tank is mounted, needs to be docked in a port for a long period of time either while the hydrate pellets, which are adhered to each other in a tank during storage and transportation of the hydrate pellets, are being fractured or pulverized and are then being moved to facilities for dissociation on land; or while the hydrate pellets are being directly dissociated by heat on the ship.

Long lay-over time which is required for loading/unloading and dissociation of hydrates is the main factor which decreases ship operation efficiency. Furthermore, a ship which sails back to a site where hydrate pellets are loaded on a ship, usually sails back with an empty cargo tank.

Generally, when hydrate pellets are just loaded in a cargo tank on a ship, the hydrate pellets are separated from each other so that grain stability is used to assess the ship stability. However, since hydrate pellets come to adhere to each other over time due to their own weights, this adhesion negatively influences ship's behavior and stability, depending upon the adhesion state within the tank.

In addition, when a ship uses a Dual Fuel Engine (DFE) to use Boil Off Gas (BOG) generated from hydrate pellets as a fuel when transporting hydrate pellets stored in a large volume tank, the characteristics of the fuel vary, because propane happens to evaporate earlier than methane in some cases, depending on the compositions of the hydrate pellets. Furthermore, when unloading the hydrate pellets from a ship, the energy and composition of dissociated gas are likely to be non-uniform.

In addition, when melting and dissociating hydrate pellets stored in a large volume tank, hot water may be used. In this case, surfactants are usually added to the hot water to prevent formation of ice within the tank. Since the surfactant-containing hot water causes environmental pollution, additional facilities to treat wastewater are needed in the process of dissociation of hydrates, resulting in an increase in cost.

DISCLOSURE

Technical Problem

Accordingly, the present invention has been made keeping in mind the above problems occurring in the prior art. An object of the present invention is to provide a container for storing, transporting, and dissociating hydrate pellets and a method for storing, transporting, and dissociating hydrate pellets using the same container which can solve the following problems of conventional containers: inter-particle adhesion of hydrate pellets which occurs during storage of hydrate pellets in a large volume tan; the consequential increase in ship's lay-over time for unloading hydrate pellets; and environmental pollution and an increase in process cost, which are attributable to use of surfactants when hydrate pellets are dissociated using hot water.

Technical Solution

In order to accomplish the above objects, according to one aspect, there is provided a container for storing, transporting, and dissociating hydrate pellets. The container includes: a first container made of a plurality of frames; a second container which is rotatably installed inside the first container, is equipped with a heat insulating member attached to an internal surface thereof, and stores hydrate pellets therein; and a refrigerating machine which is installed inside the first container and refrigerates the second container, in which the inside of the second container is equipped with a heating wire which is heated to dissociate the hydrate pellets when power is supplied thereto or with a hot water tube through which hot water flows to dissociate the hydrate pellets.

The first container may include: a plurality of support plates with respective central through-holes, through which the second container extends; and a plurality of ball bearings installed in the central through-holes to be disposed between the second container and the respective support plates, in which the second container may be rotated by rotational force within the central through-holes of the support plates.

The inside of the second container may be further equipped with a pressure sensor which senses an internal pressure of the second container and a temperature sensor which senses an internal temperature of the second container.

The second container may be connected to a BOG nozzle which discharges BOG generated in the second container outside the second container, in which the BOG nozzle may include: a first BOG nozzle which is connected to the second container and discharges the BOG outside the second container; a BOG valve which is connected to the first BOG nozzle and which controls flow of gas through the first BOG nozzle; and a second BOG nozzle which is connected to the BOG valve and a BOG collecting apparatus at respective ends and which discharges the BOG to the BOG collecting apparatus.

The second container may be connected to a gas nozzle which discharges gas generated during dissociation of the hydrate pellets outside the second container, in which the gas nozzle may include: a first gas nozzle which is connected to the second container and which discharges gas in the second container outside the second container; a gas valve which is connected to the first gas nozzle and controls flow of gas through the first gas nozzle; and a second gas nozzle which is connected to the gas valve and a gas extracting apparatus at respective ends and which causes the gas to be extracted to the gas extracting apparatus when the gas valve is open.

A blade portion may be disposed on an external surface of the second container and connected to a rotating body, and the blade portion rotates the second container by receiving rotational force of the rotating body.

The container may further include a combining member which is detachably attached to the second container and prevents and allows opening of the second container, in which the combining member may include: a first combining member of a cylinder shape which is connected to the second container, has a central hole through which the BOG nozzle extends, and has a periphery portion in which the first gas nozzle and the gas valve are embedded; a second combining member of a cylinder shape which is spaced apart from the first combining member by a predetermined distance, has a central hole through which the BOG nozzle extends, and a periphery portion in which the second gas nozzle is embedded; and a thrust bearing which is installed between the first combining member and the second combining member and which rotatably connects the second combining member with respect to the first combining member.

The second gas nozzle may become aligned with the gas valve on the same straight line as the second combining member rotates, and may communicate with the first gas nozzle when the gas valve is open.

The second combining member may include a built-in gas sensor which senses gas being leaked and a pair of coupling plates disposed on periphery portions thereof and connected to the gas extracting apparatus.

According to another aspect, there is provided a method for storing, transporting, and dissociating hydrate pellets, including: a storage step of storing hydrate pellets in a second container installed inside a first container; a transportation step of transporting the hydrate pellets while maintaining a constant internal temperature of the second container by operating a refrigerating machine installed inside the first container; and a dissociation step of dissociating the hydrate pellets by supplying heat to the inside of the second container.

The dissociation step may include: a container transportation step of transporting the first container to an inclined surface using a conveyer belt; a container rotation step of rotating the second container using rotational force of a rotating body while the second container is installed to be horizontal or inclined; a container heating step of dissociating the hydrate pellets by heating the inside of the second container; and a gas extraction step of causing gas generated during dissociation of the hydrate pellets to be extracted to the outside of the second container.

The container heating step is a step of dissociating the hydrate pellets by supplying power to a heating wire disposed on an internal surface of the second container or supplying hot water to a hot water tube disposed on the internal surface of the second container.

Advantageous Effects

According to the present invention, since a hydrate pellet container is supplied with hot water or heat while it is being rotated, hydrate pellets can be effectively dissociated.

In addition, according to the present invention, it is possible to improve a ship's availability which is decreased due to a ship's long lay-over time which is caused by the handling of hydrate pellets, which are produced in fields of NHG, loaded to or unloaded from a ship, and transported to dissociation facilities on land.

In addition, according to the present invention, since a container vessel, which is a high-speed ship, can be used instead of a full slow-speed ship equipped with a large volume tank, sailing time can be reduced and the amount of BOG is dramatically reduced.

In addition, since hydrate pellets in the container can be heated by pure hot water which does not contain surfactants therein or a heating wire, there is no need to use facilities for storage and purification of waste hot water which would be conventionally necessary.

Figure 1:
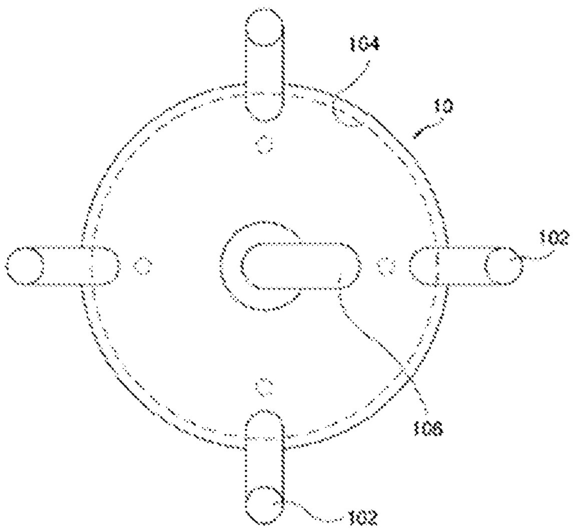
Fig. 1 PRIOR ART
FIG. 1 is a diagram illustrating the construction of an apparatus for gasifying hydrate pellets according to a conventional art.

<Description of the Reference Numerals in the Drawings>

| | |
|---|---|
| 100: First container | 200: Second container |
| 210: Heating wire | 220: Hot water tube |
| 230: Pressure sensor | 240: Temperature sensor |
| 250: BOG nozzle | 251: First BOG nozzle |
| 252: Second BOG nozzle | 253: BOG valve |
| 260: Gas nozzle | 261: First gas nozzle |
| 262: Second gas nozzle | 263: Gas valve |
| 270: Combining member | 275: First combining member |
| 280: Second combining member | |
| 281: Gas sensor | 282: Coupling plate |
| 290: Thrust bearing | 300: Refrigerating machine |
| 400: Blade portion | 500: Support plate |
| 600: Ball bearing | 700: Rotating body |
| 710: Power supply line | 720: Hot water supply line |
| 800: Gas extracting apparatus | |
| S10: Storage step | |
| S20: Transportation step | |
| S30: Dissociation step | |
| S31: Container transportation step | |
| S32: Container rotation step | |
| S33: Container heating step | |
| S34: Gas extraction step | |

BEST MODE

Hereinafter, embodiments of the present invention are described with reference to the accompanying drawings. Be noted that like elements or parts are represented by like reference signs through the drawings. In describing the present invention, a description about functions or parts which are already well known will be omitted not to obscure the scope of the present invention.

Figure 2:
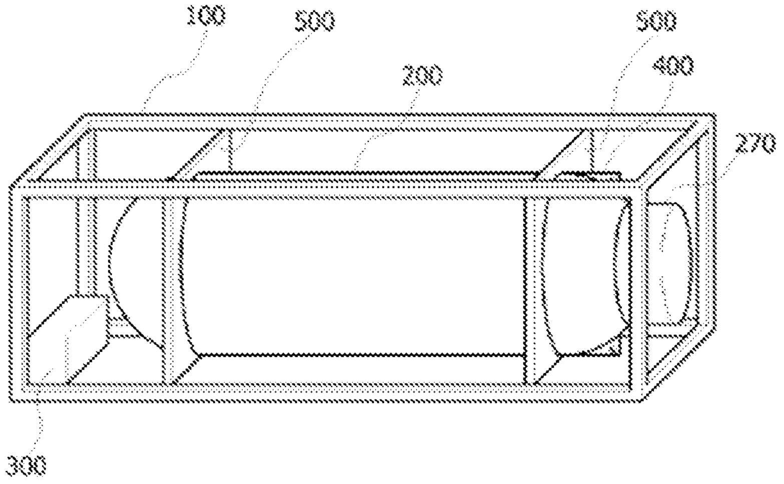
FIG. 2 is a diagram illustrating the construction of a container for storing, transporting, and dissociating hydrate pellets according to one embodiment of the present invention.

FIG. 2 is a diagram illustrating the construction of a container for storing, transporting, and dissociating hydrate pellets according to one embodiment of the present invention.

A container for storing, transporting, and dissociating hydrate pellets according to an embodiment of the present invention, as illustrated in FIG. 2, includes a first container 100, a second container 200, and a refrigerating machine 300. The refrigerating machine 300 is installed inside the first container 100 and refrigerates the second container 200.

The first container 100 has a container shape and is made of a plurality of frames to reduce the weight.

The second container 200 is rotatably installed inside the first container 100 and can contain hydrate pellets therein.

To be specific, a plurality of support plates 500 is vertically arranged inside the first container 100 at regular intervals. The support plates 500 each have their respective central through-holes. The second container 200 is horizontally installed to extend through the central through-holes of the support plates 500 and is rotatably supported by the support plates 500.

Figure 3:
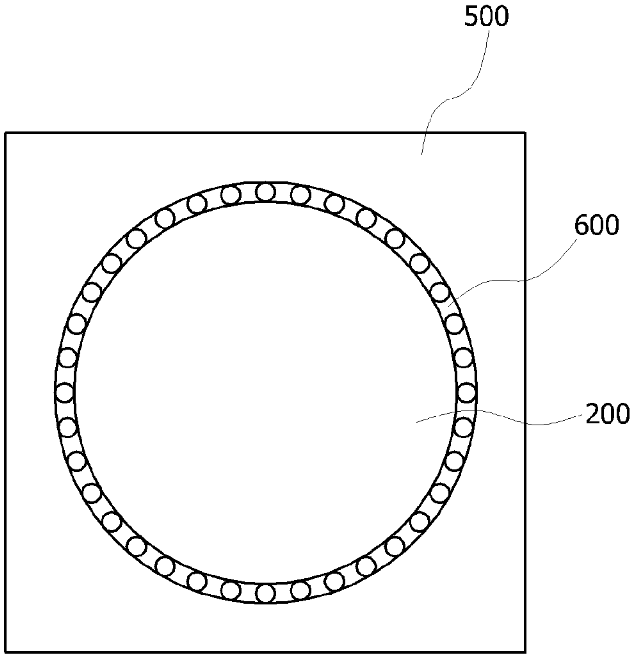
FIG. 3 is a diagram illustrating an installed state of a second container according to the embodiment of the invention.

FIG. 3 is a diagram illustrating an installed state of the second container.

The support plates 500 are spaced apart from each other at regular intervals within the first container 100. As illustrated in FIG. 3, ball bearings 600 to couple the second container 200 to the support plates 500 may be installed in the central through-holes of the support plates 500.

The ball bearings 600 enable the second container 200 to rotate within the central through-holes of the support plates 500. As the ball bearings 600 are installed between the second container 200 and the support plates 500, the second container 200 can be smoothly rotated by rotational driving force supplied from the outside. Accordingly, the second container 200 can be uniformly refrigerated or heated when it is refrigerated by the refrigerating machine 300 or heated by means of a heating wire or a hot water tube.

The inside of the second container 200 may be in a vacuum, or the second container 200 may be a heat-insulating container with an internal surface to which a heat-insulating member (not shown) is attached.

Since the second container 200 is a heat-insulating container, the refrigerated state of the second container 200 is maintained for a long period of time once the second container 200 is refrigerated by the refrigerating machine 300, so that the hydrate pellets stored in the second container 200 can maintain its self-preserved state.

For self-preservation of the hydrate pellets stored in the second container 200, the second container 100 maintains a suitable temperature and pressure which varies depending on the composition of the hydrate pellets, thereby preventing the hydrate pellets from being dissociated as long as possible during transportation.

On the other hand, when the second container 200 is heated by means of a heating wire or a hot water tube embedded therein for the purpose of dissociation of the hydrate pellets, the second container 200 maintains the heated state so that the hydrate pellets can be easily dissociated.

Mode for Invention

Hereinafter, embodiments of the present invention are described with reference to the accompanying drawings. Be noted that like elements or parts are represented by like reference signs through the drawings. In describing the present invention, a description about functions or parts which are already well known will be omitted not to obscure the scope of the present invention.

FIG. 2 is a diagram illustrating the construction of a container for storing, transporting, and dissociating hydrate pellets according to one embodiment of the present invention.

A container for storing, transporting, and dissociating hydrate pellets according to an embodiment of the present invention, as illustrated in FIG. 2, includes a first container 100, a second container 200, and a refrigerating machine 300. The refrigerating machine 300 is installed inside the first container 100 and refrigerates the second container 200.

The first container 100 has a container shape and is made of a plurality of frames to reduce the weight.

The second container 200 is rotatably installed inside the first container 100 and can contain hydrate pellets therein.

To be specific, a plurality of support plates 500 is vertically arranged inside the first container 100 at regular intervals. The support plates 500 each have their respective central through-holes. The second container 200 is horizontally installed to extend through the central through-holes of the support plates 500 and is rotatably supported by the support plates 500.

FIG. 3 is a diagram illustrating an installed state of the second container.

The support plates 500 are spaced apart from each other at regular intervals within the first container 100. As illustrated in FIG. 3, ball bearings 600 to couple the second container 200 to the support plates 500 may be installed in the central through-holes of the support plates 500.

The ball bearings 600 enable the second container 200 to rotate within the central through-holes of the support plates 500. As the ball bearing 600 is installed between the second container 200 and the support plates 500, the second container 200 can be smoothly rotated by rotational driving force supplied from the outside. Accordingly, the second container 200 can be uniformly refrigerated or heated when it is refrigerated by the refrigerating machine 300 or heated by means of a heating wire or a hot water tube.

The inside of the second container 200 may be in a vacuum, or the second container 200 may be a heat-insulating container with an internal surface to which a heat-insulating member (not shown) is attached.

Since the second container 200 is a heat-insulating container, the refrigerated state of the second container 200 is maintained for a long period of time once the second container 200 is refrigerated by the refrigerating machine 300, so that the hydrate pellets stored in the second container 200 can maintain its self-preserved state.

For self-preservation of the hydrate pellets stored in the second container 200, the second container 100 maintains a suitable temperature and pressure which varies depending on the composition of the hydrate pellets, thereby preventing the hydrate pellets from being dissociated as long as possible during transportation.

On the other hand, when the second container 200 is heated by means of a heating wire or a hot water tube embedded therein for the purpose of dissociation of the hydrate pellets, the second container 200 maintains the heated state so that the hydrate pellets can be easily dissociated.

Figure 4:
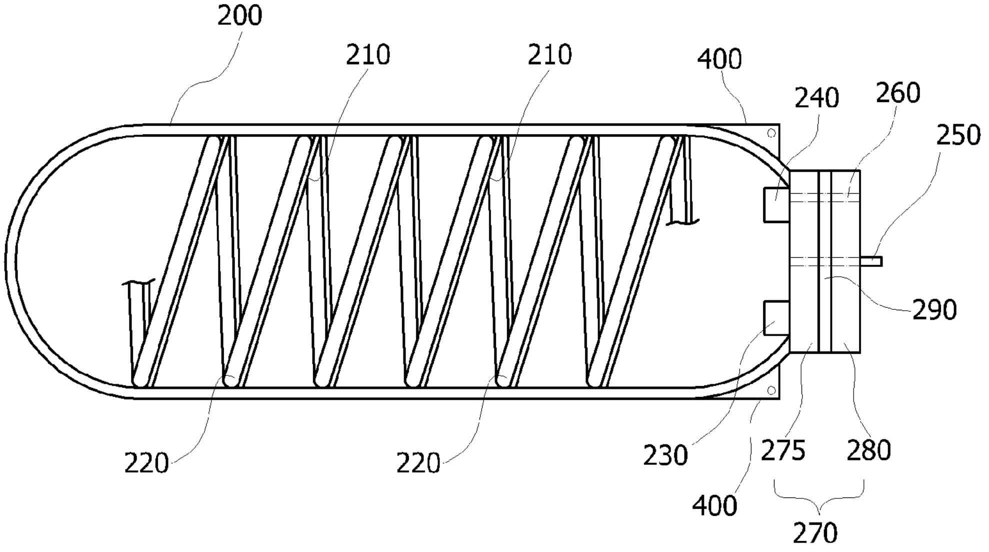
FIG. 4 is a diagram illustrating the internal construction of the second container according to the embodiment of the present invention.

FIG. 4 is a diagram illustrating the internal construction of the second container according to one embodiment of the invention.

As illustrated in FIG. 4, the second container 200 may be equipped with a heating wire 210 or a hot water tube 220 to dissociate the hydrate pellets and with a pressure sensor 230 and a temperature sensor 240 to sense the internal pressure and temperature of the second container 200, respectively.

The heating wire 210 may be installed on the internal surface of the second container 200. The heating wire 210 heats the second container 200 when it is powered by a power supply unit (not shown) installed outside the first container 100, enabling the hydrate pellets to be easily dissociated.

When hot water is supplied to the hot water tube 220 from a hot water supply unit (not shown) installed outside the first container 100, the hot water tube 220 heats the second container 20, enabling the hydrate pellets to be easily dissociated.

The pressure sensor 230 and the temperature sensor 240 senses the internal pressure and temperature of the second container 200, respectively when the second container 200 is refrigerated for transportation of the hydrate pellets or heated for dissociation of the hydrate pellets, and outputs the values of the measurements to a control unit (not shown). The control unit causes the refrigerating machine 300 to refrigerate the second container 200 when the internal temperature of the second container 200 is higher than a preset temperature, and causes the heating wire 210 to be supplied with power or the hot water tube 220 to be supplied with hot water so that the second container 200 can be heated when the internal temperature of the second container 200 is lower than the preset temperature. In addition, the control unit causes the second container 200 to discharge Boiled Off Gas (BOG) through a BOG nozzle described later in order to reduce the internal pressure of the second container 200, when the internal pressure of the second container 200 rises beyond a preset pressure due to the BOG generated in the second container 200 during transportation of the hydrate pellets.

Figure 5:
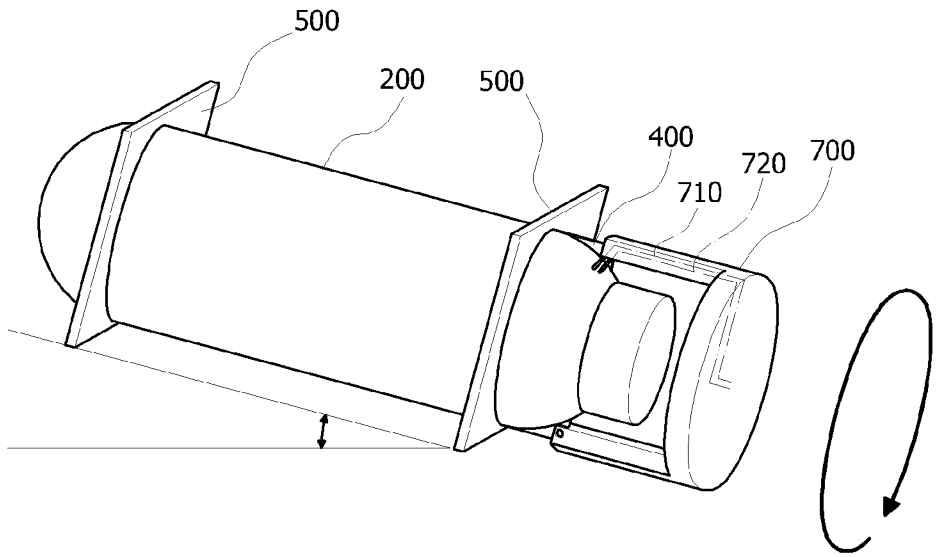
FIG. 5 is a diagram illustrating a combined state of the second container and a rotating body according to the embodiment of the present invention.

FIG. 5 is a diagram illustrating a combined state of the second container and a rotating body.

A blade portion 400 may be attached to the external surface of the second container 200 as illustrated in FIGS. 2 and 4. The blade portion 400 is connected to a rotating body 700 as illustrated in FIG. 5, and rotates the second container 20 by receiving rotational force of the rotating body 700.

In the rotating body 700, a power supply line 710 of the power supply unit (not shown) or a hot water supply line 720 of the hot water supply unit (not shown) may be embedded.

Figure 6:
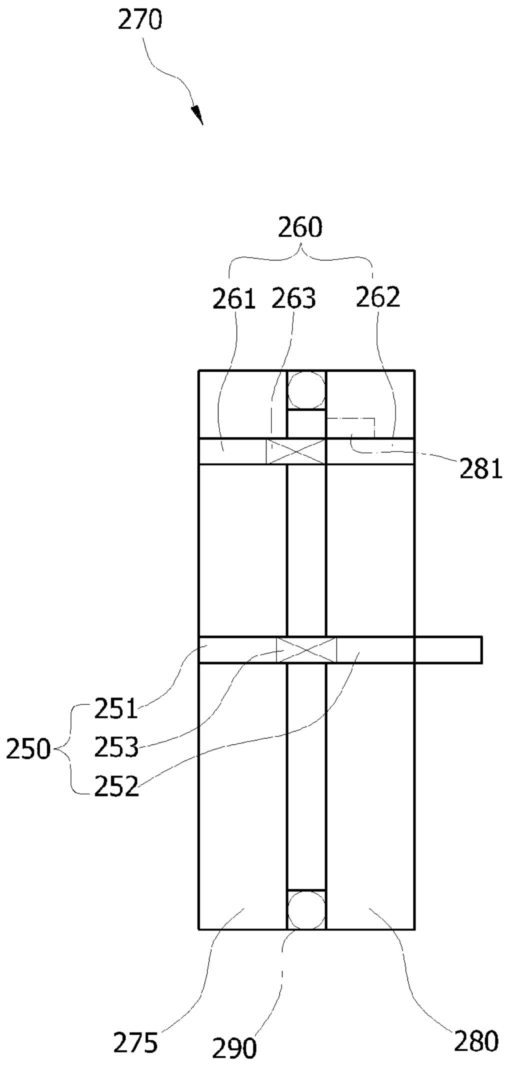
FIG. 6 is a diagram illustrating a combined state of a first combining member and a second combining member according to the embodiment of the present invention.

FIG. 6 is a diagram illustrating a combined state of a first combining member and a second combining member.

As illustrated in FIG. 6, the second container 200 may be connected to a BOG nozzle 250 and a gas nozzle 260 in order to discharge BOG and gas, generated originating from the hydrate pellets, outside the second container 200.

To be specific, the BOG nozzle 250 enables the BOG generated in the second container 200 during transportation of the hydrate pellets to be discharged outside the second container 200, and the gas nozzle 260 enables gas generated in the second container 200 during dissociation of the hydrate pellets to be discharged outside the second container 200.

The BOG nozzle 250 may include a first BOG nozzle 251, a BOG valve 253, and a second BOG nozzle 252.

Specifically, the first BOG nozzle 251 is connected to the second container 200 and allows the BOG in the second container 200 to be discharged outside the second container 200 therethrough.

The BOG valve 253 is connected to the first BOG nozzle 251 and controls the flow of the BOG through the first BOG nozzle 251.

The BOG valve 253 opens when the internal pressure of the second container 200 exceeds the preset pressure, and closes when the internal pressure of the second container 200 is within a predetermined range.

The second BOG nozzle 252 is connected to the BOG valve 253 and a BOG collecting apparatus (not shown) at respective ends thereof. When the BOG valve 253 is open, the BOG can be discharged to the BOG collecting apparatus (not shown).

The gas nozzle 260 may include a first gas nozzle 261, a gas valve 263, and a second gas nozzle 262.

To be specific, the first gas nozzle 261 is connected to the second container 200 and allows the gas in the second container 200 to be discharged outside the second container 200 therethrough.

The gas valve 263 is connected to the first gas nozzle 262 and controls the flow of gas through the first gas nozzle 261.

The second gas nozzle 262 is connected to the gas valve 263 and a gas extracting apparatus at respective ends thereof, respectively. When the gas valve is open, the gas is extracted by the gas extracting apparatus.

The container for storing, transporting, and dissociating hydrate pellets according to the embodiment of the invention may further include a combining member 270 which is detachably attached to the second container 200 and prevents or allows opening of the second container 200.

To be specific, the combining member 270 includes a first combining member 275 connected to the second container 200, a second combining member 280 spaced apart from the first combining member 275 by a predetermined distance, and a thrust bearing 298 which is installed between the first combining member 275 and the second combining member 280 and rotatably connects the second combining member 280 with respect to the first combining member 275.

Figure 7:
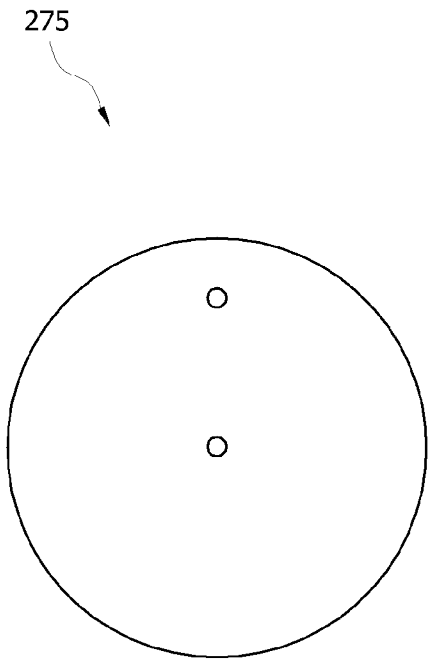
FIG. 7 is a diagram illustrating the first combining member according to the embodiment of the present invention.

FIG. 7 is a diagram illustrating the internal construction of the first combining member.

To be specific, the first combining member 275 has a cylinder shape, is connected to the second container 200, and can be rotated along with rotation of the second container 200. As illustrated in FIG. 7, the first combining member has a central hole through which the BOG nozzle 250 extends and a peripheral hole in which the first gas nozzle 261 and the gas valve 263 are embedded.

Figure 8:
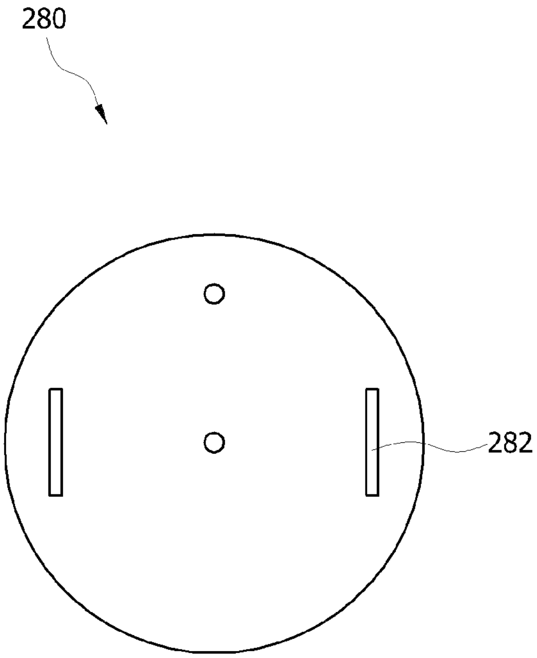
FIG. 8 is a diagram illustrating the second combining member according to the embodiment of the present invention.

FIG. 8 is a diagram illustrating the construction of the second combining member.

The second combining member 280 has a cylinder shape and is rotatably connected to the first combining member 275 via the thrust bearing 290. As illustrated in FIG. 6, a gas sensor 281 which senses gas being leaked may be built in the second combining member 280. As illustrated in FIG. 8, the second combining member 280 may have a central hole through which the BOG nozzle 250 extends and a peripheral hole in which the second gas nozzle 262 is embedded.

The second gas nozzle 262 may be aligned with the gas valve 263 on the same straight line as the second combining member 280 rotates as illustrated in FIG. 6, and can communicate with the first gas nozzle 261 when the gas valve 263 is open.

Figure 9:
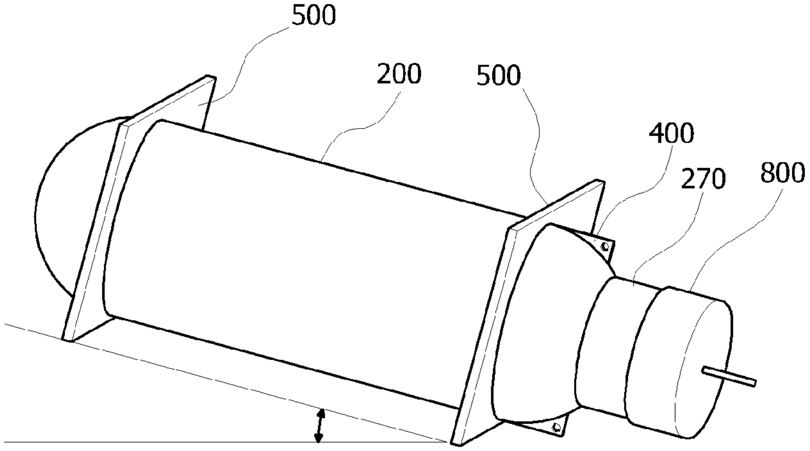
FIG. 9 is a diagram illustrating a combined state of the second combining member and a gas extracting apparatus according to the embodiment of the present invention.

FIG. 9 is a diagram illustrating a combined state of the second combining member and the gas extracting apparatus.

The second combining member 280 may be equipped with a pair of coupling plates 282 at periphery portions thereof. As illustrated in FIG. 9, the coupling plates 282 are inserted and fixed in the gas extracting apparatus 800, enabling the combining member to be coupled to the gas extracting apparatus 800.

Hereinafter, a method for storing, transporting, and dissociating hydrate pellets according to one embodiment of the invention will be described.

Figure 10:
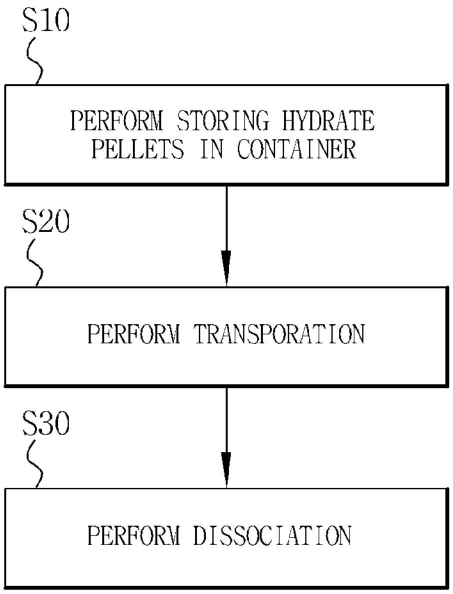
FIG. 10 is a flowchart illustrating a method for storing, transporting, and dissociating hydrate pellets according to one embodiment of the present invention.

FIG. 10 is a flowchart illustrating the method for storing, transporting, and dissociating hydrate pellets according to the embodiment of the invention.

As illustrated in FIG. 8, the method for storing, transporting, and dissociating hydrate pellets according to the embodiment of the invention includes a storage step (S10), a transportation step (S20), and a dissociation step (S30).

In the storage step S10, as illustrated in FIG. 2, hydrate pellets are stored in the second container 200 installed inside the first container 100.

In the storage step S10, the combining member 270 combined with the second container 200 is removed, the hydrate pellets are charged into the second container 200, and the combining member 270 is assembled back with the second container 200. In this way, the hydrate pellets can be charged into and stored in the second container 200.

In the transportation step S20, the refrigerating machine 300 installed inside the first container 100 operates to maintain a constant internal temperature of the second container 200 while the hydrate pellets are being transported.

In the transportation step S20, BOG is generated so that the internal pressure of the second container 200 rises. In this case, as illustrated in FIG. 6, the BOG nozzle 250 opens so that the BOG can be collected in a gas container for later use as necessary. However, when the BOG is unfit for use in an economic sense, i.e., in terms that the amount of the BOG is very small or that the BOG is mixed with undesirable substances, the BOG is discharged to volatilize into the air.

In the dissociation step S30, the hydrate pellets are dissociated by applying heat to the inside of the second container 200.

Figure 11:
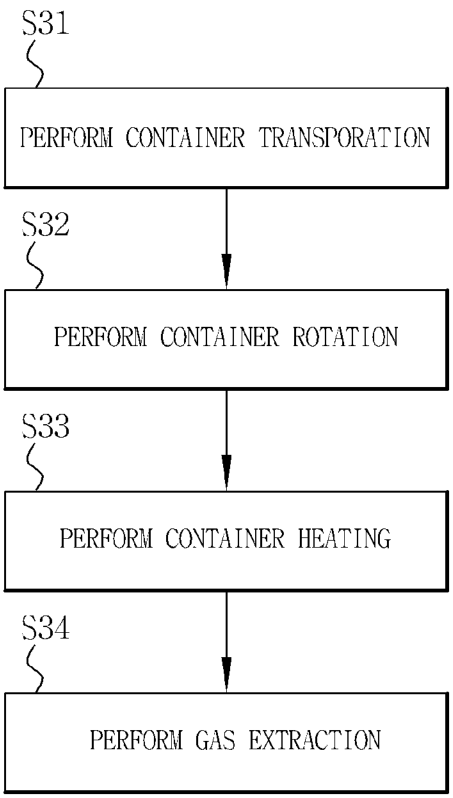
FIG. 11 is a flowchart illustrating a dissociation step according to the embodiment of the present invention.

FIG. 11 is a flowchart illustrating sub-steps of the dissociation step.

As illustrated in FIG. 11, the dissociation step S30 includes a container transportation step S31, a container rotation step S32, a container heating step S33, and a gas extraction step S34.

In the container transportation step S31, the first container 100 is moved to an inclined surface using a conveyer belt.

In the container rotation step S32, as illustrated in FIG. 5, the second container 200 is placed to be horizontal or inclined, the blade portion 400 is connected to the rotating body 700, and the second container 200 is rotated by the rotational force of the rotating body 700. As the second container 200 is rotated, dissociation of the hydrate pellets can be smoothly performed.

In the container heating step S33, the inside of the second container 200 is heated so that the hydrate pallets are dissociated.

To be specific, in the container heating step S33, as illustrated in FIG. 4, power is supplied to the heating wire 210 disposed on the internal surface of the second container 200, or hot water flows through the hot water tube 220 disposed on the internal surface of the second container 200. By heating the second container 200 in this way, the hydrate pellets can be dissociated.

In the gas extraction step S34, gas generated during the dissociation of the hydrate pellets is extracted to the outside of the second vessel 200.

Specifically, in the gas extraction step S34, the second combining member 280 is rotated with respect to the first combining member 275 so that the first gas nozzle 261 can be aligned with the second gas nozzle on the same straight line, and then the gas valve 263 opens so that the first gas nozzle 261 and the second gas nozzle 261 can communicate with each other. With this operation, the gas generated in the second container 200 is extracted to the outside of the second container 200.

Although a container for storing, transporting, and dissociating hydrate pellets and a method for storing, transporting, and dissociating hydrate pellets using the same container according to preferred embodiments of the present invention have been described for illustrative purposes with reference to the accompanying drawings, those skilled in the art will appreciate that various modifications, additions and substitutions are possible, without departing from the scope and spirit of the invention as disclosed in the accompanying claims.

INDUSTRIAL APPLICABILITY

According to the present invention, since it is possible to easily store and transport hydrate pellets using a container and to easily dissociate hydrate pellets by heating the container while rotating the container, the container and method according to the present invention can be effectively used for storage, transportation, and dissociation of hydrate pellets.

The invention claimed is:

1. A container for storing, transporting, and dissociating hydrate pellets, the container comprising:

a first container made up of a plurality of frames;

a second container which is rotatably installed inside the first container, stores hydrate pellets therein, and has an internal surface to which a heat insulating member is attached;

a refrigerating machine which is installed inside the first container and refrigerates the second container, a blade portion disposed on an external surface of the second container and connected to a rotating body, and a combining member which is detachably connected to the second container and prevents or allows opening of the second container, wherein the combining member includes:

a first combining member of a cylinder shape which is connected to the second container and has a central hole, through which a Boiled Off Gas (BOG) nozzle extends, and a periphery portion in which a first gas nozzle and a first gas valve are embedded;

a second combining member of a cylinder shape which is spaced apart from the first combining member by a predetermined distance and has a central hole, through which the BOG nozzle extends, and a periphery portion in which a second gas nozzle is embedded; and a thrust bearing which is installed between the first combining member and the second combining member and which combines the first and second combining members such that the second combining member is rotatable with respect to the first combining member, and wherein the blade portion rotates the second container by receiving rotational force of the rotating body, and wherein the second container is equipped with a heating wire, which is heated to dissociate the hydrate pellets by being supplied with power, or with a hot water tube, through which hot water flows to dissociate the hydrate pellets, on the internal surface thereof, and the second container is connected to the BOG nozzle to discharge BOG, generated in the second container, outside the second container, and wherein the BOG nozzle includes:

a first BOG nozzle, which is connected to the second container and discharges the BOG in the second container outside the second container;

a BOG valve connected to the first BOG nozzle and controls flow of the BOG through the first BOG nozzle; and a second BOG nozzle is connected to a BOG collecting apparatus and the BOG valve at respective ends thereof so that the BOG is discharged to the BOG collecting apparatus when the BOG valve is open, and wherein the second container is connected to a gas nozzle to discharge gas generated during dissociation of the hydrate pellets outside the second container, and wherein the gas nozzle includes:

the first gas nozzle which is connected to the second container and which discharges the gas in the second container outside the second container;

the gas valve which is connected to the first gas nozzle and controls flow of the gas through the first gas nozzle; and the second gas nozzle which is connected to the gas valve and a gas extracting apparatus at respective ends thereof and causes the gas to be extracted to the gas extracting apparatus when the gas valve is open.

2. The container according to claim 1, wherein the first container comprises:

a plurality of support plates with respective central through-holes, through which the second container extends; and a plurality of ball bearings, each being installed in the central through-hole so as to be disposed between the second vessel and the support plate, wherein the second container is rotated by rotational force within the central through-holes of the support plates.

3. The container according to claim 2, wherein a pressure sensor which senses an internal pressure of the second container and a temperature sensor which senses an internal temperature of the second container are disposed inside the second container.

4. The container according to claim 1, wherein the second gas nozzle becomes aligned with the gas valve on the same straight line as the second combining member rotates, and communicates with the first gas nozzle when the gas valve is open.

5. The container according to claim 4, wherein the second combining member is equipped with a built-in gas sensor which senses gas being leaked and with a pair of coupling plates connected to the gas extracting apparatus and disposed at a peripheral portion thereof.

* * * * *